(12) United States Patent
Cheng

(10) Patent No.: US 10,310,670 B2
(45) Date of Patent: Jun. 4, 2019

(54) SYSTEM AND METHOD FOR CAPACITIVE SENSING

(71) Applicant: SILEAD INC., Shanghai (CN)

(72) Inventor: Taiyi Cheng, Cupertino, CA (US)

(73) Assignee: SILEAD INC., Shanghai (CN)

( * ) Notice: Subject to any disclaimer, the term of this patent is extended or adjusted under 35 U.S.C. 154(b) by 0 days.

(21) Appl. No.: 15/543,924

(22) PCT Filed: Jan. 16, 2015

(86) PCT No.: PCT/US2015/011821
§ 371 (c)(1),
(2) Date: Jul. 14, 2017

(87) PCT Pub. No.: WO2016/114795
PCT Pub. Date: Jul. 21, 2016

(65) Prior Publication Data
US 2018/0011599 A1    Jan. 11, 2018

(51) Int. Cl.
G06F 3/044 (2006.01)
G06F 3/041 (2006.01)
G06K 9/00 (2006.01)

(52) U.S. Cl.
CPC .......... G06F 3/0418 (2013.01); G06F 3/044 (2013.01); G06F 3/0416 (2013.01); G06K 9/0002 (2013.01)

(58) Field of Classification Search
CPC ......... G06F 3/0418; G06F 3/041; G06F 3/044
See application file for complete search history.

(56) References Cited

U.S. PATENT DOCUMENTS

| 7,944,216 | B2 | 5/2011 | Brasseur et al. |
| 8,125,456 | B2 | 2/2012 | Krah et al. |
| 8,493,331 | B2 | 7/2013 | Krah et al. |

(Continued)

OTHER PUBLICATIONS

International Searching Authority (U.S.), "PCT Notification of Transmittal of the International Search Report and the Written Opinion of the International Searching Authority, or the Declaration", International Application No. PCT/US2015/011821, dated Apr. 10, 2015, 10 pages.

(Continued)

*Primary Examiner* — Ibrahim A Khan
(74) *Attorney, Agent, or Firm* — Haynes and Boone, LLP

(57) ABSTRACT

Disclosed is a system and method for a capacitive sensing device. The method includes transmitting a stimulation signal to a driving channel of the capacitive sensing device. The stimulation signal includes a plurality of sub-stimulation signals. Each of the sub-stimulation signals is characterized by an amplitude and a frequency. The frequencies of the sub-stimulation signals are orthogonal. The method further includes receiving a charge signal from a sensing channel of the capacitive sensing device. The charge signal is generated from the stimulation signal through a capacitance between the driving channel and the sensing channel. The method further includes detecting, from the charge signal, a plurality of sub-charge signal amplitudes at the frequencies of the sub-stimulation signals, and reporting a value about the capacitance from the sub-charge signal amplitudes. The method benefits the capacitive sensing device for increased noise immunity, reduced dynamic range, and reduced power consumption.

19 Claims, 9 Drawing Sheets

(56) References Cited

U.S. PATENT DOCUMENTS

| | | | |
|---|---|---|---|
| 8,592,697 B2 | 11/2013 | Hotelling et al. | |
| 2007/0025739 A1 | 2/2007 | Moore et al. | |
| 2008/0158180 A1* | 7/2008 | Krah | G06F 3/03545 345/173 |
| 2009/0060003 A1* | 3/2009 | Hayashi | H04J 11/0069 375/139 |
| 2010/0292945 A1* | 11/2010 | Reynolds | G06F 3/044 702/65 |
| 2010/0300773 A1* | 12/2010 | Cordeiro | G06F 3/044 178/18.06 |
| 2011/0037724 A1 | 2/2011 | Paulsen et al. | |
| 2011/0063227 A1* | 3/2011 | Wu | G06F 3/0416 345/173 |
| 2012/0062497 A1* | 3/2012 | Rebeschi | G06F 3/03545 345/174 |
| 2012/0218222 A1* | 8/2012 | Shen | G06F 3/0418 345/174 |
| 2012/0274609 A1 | 11/2012 | Sheng et al. | |
| 2013/0021294 A1* | 1/2013 | Maharyta | G06F 3/0416 345/174 |
| 2013/0176271 A1* | 7/2013 | Sobel | G06F 3/041 345/174 |
| 2013/0176272 A1* | 7/2013 | Cattivelli | G06F 3/041 345/174 |
| 2014/0035874 A1* | 2/2014 | Iizuka | G06F 3/0416 345/174 |
| 2014/0327644 A1* | 11/2014 | Mohindra | G06F 3/044 345/174 |
| 2014/0362055 A1* | 12/2014 | Altekar | G06F 3/0436 345/177 |
| 2015/0091845 A1* | 4/2015 | Park | G06F 3/044 345/174 |
| 2015/0277621 A1* | 10/2015 | Roberson | G06F 3/044 345/174 |
| 2015/0301651 A1* | 10/2015 | Leigh | G06F 3/042 345/174 |
| 2016/0117051 A1* | 4/2016 | Han | G06F 3/044 345/173 |
| 2016/0282996 A1* | 9/2016 | Wu | G06F 3/0418 |

OTHER PUBLICATIONS

International Preliminary Examining Authority (U.S.), "PCT Written Opinion of the International Preliminary Examining Authority", International Application No. PCT/US2015/011821, dated Nov. 29, 2016, 6 pages.

International Preliminary Examining Authority (U.S.), "PCT Notification of Transmittal of International Preliminary Report on Patentability", International Application No. PCT/US2015/011821, dated Feb. 24, 2017, 5 pages.

* cited by examiner

SYSTEM AND METHOD FOR CAPACITIVE SENSING

CROSS REFERENCE TO RELATED APPLICATIONS

This application is a U.S. national phase application of co-pending international patent application No. PCT/US2015/011821 filed Jan. 16, 2015, the disclosure of which is incorporated herein by reference.

TECHNICAL FIELD

The present disclosure generally relates to electronic devices capable of sensing events. More particularly, but not by way of limitation, the present disclosure relates to a method of driving and sensing for a capacitive sensing apparatus, such as a capacitive touch panel or a capacitive fingerprint sensor, and a system thereof.

BACKGROUND

Capacitive sensing apparatus are widely used in electronic devices such as smart phones, tablet computers, wearable devices, and fingerprint scanners. Examples of capacitive sensing apparatus include touch panels (or touch screens) and fingerprint sensors.

Touch panels typically include a touch-sensitive surface. When a stylus or a human body part, such as a finger, touches a point on the surface, the touch position is recognized and processed. Upon this principle, a user may make a selection or a gesture.

One type of touch panels, capacitive touch panel using mutual capacitance sensing technology, has gained popularity due to its capability of sensing multiple touch points (or multi-touch) simultaneously. A mutual capacitance sensing touch panel typically includes two conductive layers separated by a dielectric layer. The two conductive layers may be made of a transparent conductive material such as indium tin oxide (ITO). The two conductive layers each include a plurality of conductors oriented in a particular direction. A mutual capacitance forms when one conductor in one layer overlays another conductor in the other layer. In one exemplary panel, one layer includes M row conductors in the horizontal direction and the other layer includes N column conductors in the vertical direction so as to form a matrix of M×N mutual capacitances in the panel, one in each intersection. When a finger touches the panel, human body capacitance to ground effectively alters the mutual capacitance at the touch point, which can be detected to indicate the touch position.

Capacitive fingerprint sensors may include a single row of sensors (e.g. sweep scanners) or a two-dimensional array of sensors (e.g. area scanners). Each sensor typically includes an active capacitive feedback circuit whose effective capacitance is decreased by the presence of a finger near the sensor. The amount of capacitance decrease is more for ridges and less for valleys, thereby allowing the user's fingerprint to be recorded or recognized.

A device using the above capacitive sensing apparatus (e.g. a touch panel or a fingerprint sensor) further includes driving and sensing circuits that drive signals to and sense outputs from the apparatus in order to detect the touch events. For example, a stimulus in the form of a square wave or a sine wave is driven onto a driving channel (e.g. a row conductor in a touch panel). This stimulus is coupled onto a sensing channel (e.g. a column conductor in a touch panel) through a capacitance between the driving and sensing channels. The outputs from the sensing channels are monitored (or sensed) for detecting the touch events. When a finger touches the apparatus, one or more of the outputs from the sensing channels will change in magnitude, indicating the touch positions in the case of touch panels, or the touch impression in the case of fingerprint sensors.

However, noises can easily interfere with the stimulus and/or the outputs, causing sensing errors. For example, noises may come from nearby environment having wireless signals such as 802.11 and Bluetooth, a switched-mode power supply, and the like. To increase sensing accuracy, common methods increase the amplitude of the stimulus or increase the time period for sensing. However, increasing the stimulus amplitude requires increased dynamic range in the circuits, and increasing the time period slows down the sensing operation. Either method also results in higher power consumption.

Accordingly, what is needed is improvement in the driving and sensing circuits associated with the capacitive sensing apparatus.

SUMMARY

The present disclosure relates to devices, systems, and methods for sensing events. More particularly, the present disclosure relates to a method of driving and sensing for a capacitive sensing apparatus and a system thereof. An object of the present disclosure is to provide systems and methods for driving signals to and sensing outputs from a capacitive multi-touch system or a capacitive fingerprint scanner so as to increase its capacitance sensing accuracy.

In one exemplary aspect, the present disclosure is directed to a method of driving and sensing for a capacitive sensing device. The method includes transmitting a stimulation signal to a driving channel of the capacitive sensing device. The stimulation signal includes a plurality of sub-stimulation signals. Each of the sub-stimulation signals is characterized by an amplitude and a frequency, wherein the frequencies of the sub-stimulation signals are orthogonal. The method further includes receiving a charge signal from a sensing channel of the capacitive sensing device, wherein the charge signal is generated from the stimulation signal through a capacitance between the driving channel and the sensing channel. The method further includes detecting, from the charge signal, a plurality of sub-charge signal amplitudes at the frequencies of the sub-stimulation signals, and reporting a value about the capacitance from the sub-charge signal amplitudes. Embodiments of this method enable simultaneous capacitance sensing with multiple orthogonal signals, thereby increasing sensing accuracy without increasing the requisite dynamic range in the circuits.

In some embodiments of the method, the reporting of the value about the capacitance includes checking the sub-charge signal amplitudes for corruption. If a sub-charge signal amplitude is found to be corrupted, the method either discards the corrupted sub-charge signal amplitude or gives it less weight than those that are not corrupted when calculating or estimating the value about the capacitance. In an embodiment, the checking of the sub-charge signal amplitudes for corruption is based on a correlation among the amplitudes of the sub-stimulation signals. This increases capacitance sensing accuracy in a noisy environment.

In embodiments of the method, the amplitudes of the sub-stimulation signals may be the same, form a subset of a random sequence, form a subset of an error-correcting code such as the Hadamard code, or form a subset of a Zadoff-Chu sequence. Further, the detecting of the plurality of sub-charge signal amplitudes is performed at the same or different phases as the sub-stimulation signals, thereby increasing design flexibility.

In another exemplary aspect, the present disclosure is directed to a method of driving and sensing for a capacitive sensing device. The method includes generating a plurality of stimulation signals. Each of the stimulation signals includes a plurality of sub-stimulation signals. Each of the sub-stimulation signals is characterized by an amplitude and a frequency, wherein the frequencies of the sub-stimulation signals are orthogonal. The method further includes transmitting the stimulation signals to a plurality of driving channels of the capacitive sensing device, wherein each one of the stimulation signals corresponds to each one of the driving channels. The method further includes receiving a charge signal from a sensing channel of the capacitive sensing device, wherein the charge signal is generated from the stimulation signals through capacitances between the driving channels and the sensing channel. The method further includes detecting, from the charge signal, a plurality of sub-charge signal amplitudes at the frequencies of the sub-stimulation signals, and reporting values about the capacitances from the sub-charge signal amplitudes. Embodiments of this method enable simultaneous scanning of multiple rows of a touch panel with orthogonal signals, thereby increasing scanning frame rates.

In some embodiments of the method, the stimulation signals each have the same number of sub-stimulation signals. In some embodiments of the method, at least two of the stimulation signals have different numbers of sub-stimulation signals.

In further embodiments of the method, the amplitudes of the sub-stimulation signals may be the same, or form a subset of: a random sequence, an error-correcting code, or a Zadoff-Chu sequence. In embodiments of the method, the reporting of the values about the capacitances includes checking the sub-charge signal amplitudes for corruption and, upon a condition that a sub-charge signal amplitude is found to be corrupted, either discarding the corrupted sub-charge signal amplitude or giving it less weight than the ones of the sub-charge signal amplitudes that are not corrupted, thereby increasing noise immunity of the capacitance sensing operations.

In yet another exemplary aspect, the present disclosure is directed to a system of driving and sensing for a capacitive sensing device. The system includes a driving module and a receiving module.

The driving module is adapted to transmit a stimulation signal to a driving channel of the capacitive sensing device. The stimulation signal includes a plurality of sub-stimulation signals. Each of the sub-stimulation signals is characterized by an amplitude and a frequency. The frequencies of the sub-stimulation signals are orthogonal.

The receiving module is adapted to receive a charge signal from a sensing channel of the capacitive sensing device. The charge signal is generated from the stimulation signal through a capacitance between the driving channel and the sensing channel. The receiving module is also adapted to detect, from the charge signal, a plurality of sub-charge signal amplitudes at the frequencies of the sub-stimulation signals. The receiving module is also adapted to report a value about the capacitance from the sub-charge signal amplitudes.

In some embodiments of the system, the driving module includes a code generator, a modulator, a mixer, an up-converter, or a combination thereof. The code generator is adapted to generate a plurality of codes. The modulator is adapted to modulate a plurality of orthogonal frequencies with the plurality of codes so as to generate the sub-stimulation signals. The mixer is adapted to combine the sub-stimulation signals into a first signal that has a lower frequency than the stimulation signal. The up-converter is adapted to convert the first signal to the stimulation signal.

In some embodiments of the system, the receiving module includes a down-converter, a de-modulator, a decision unit, or a combination thereof. The down-converter is adapted to convert the charge signal to a second signal that has a lower frequency than the charge signal, such as a baseband or intermediate frequency band signal. The de-modulator is adapted to detect the plurality of sub-charge signal amplitudes from the second signal. In an embodiment, the de-modulator includes a plurality of match filter decoders at the orthogonal frequencies, thereby increasing design flexibility. The decision unit is adapted to calculate the value about the capacitance from the sub-charge signal amplitudes.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one having ordinary skill in the art from the following detailed description.

BRIEF DESCRIPTION OF THE DRAWINGS

The accompanying drawings illustrate embodiments of the systems and methods disclosed herein and together with the description, serve to explain the principles of the present disclosure.

DETAILED DESCRIPTION

Figure 1A:
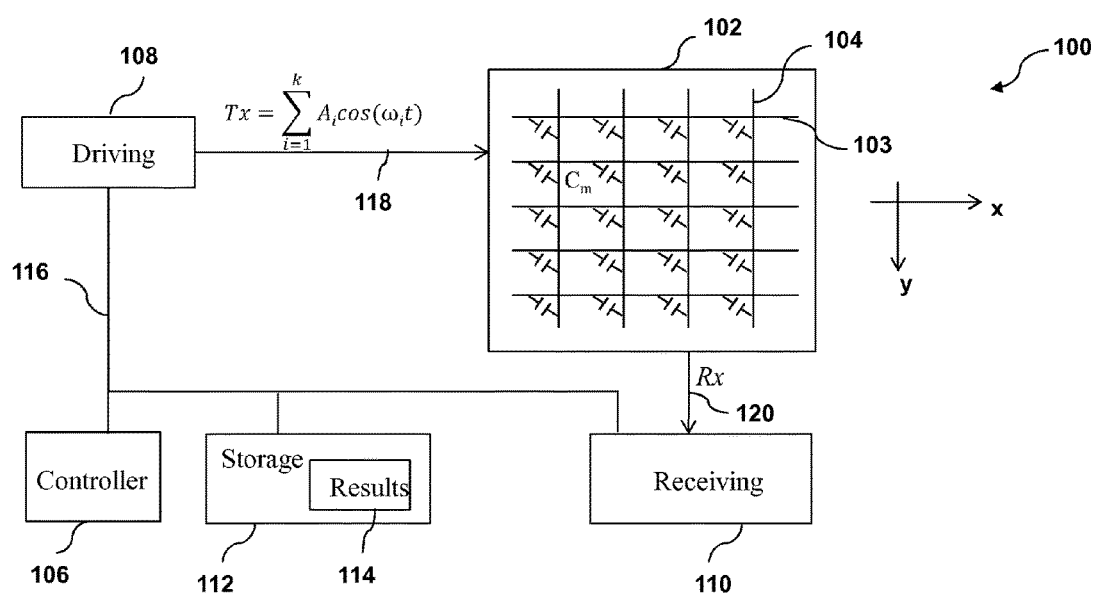
FIG. 1A is a schematic diagram illustrating a capacitive sensing system according to aspects of the present disclosure.

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one having ordinary skill in the art to which the disclosure relates. For example, the features, components, and/or steps described with respect to one embodiment may be combined with the features, components, and/or steps described with respect to other embodiments of the present disclosure to form yet another embodiment of a device, system, or method according to the present disclosure even though such a combination is not explicitly shown. Further, for the sake of simplicity, in some instances the same reference numerals are used throughout the drawings to refer to the same or like parts.

FIG. 1A illustrates an embodiment of a capacitive sensing system 100 constructed according to various aspects of the present disclosure. Referring to FIG. 1A, the capacitive sensing system 100 includes a capacitive sensing apparatus 102, a controller 106, a driving module 108, a receiving module 110, and a storage unit 112 that stores one or more capacitance sensing results 114. The various components are linked by one or more system buses 116. The capacitive sensing apparatus 102 is a touch panel in this embodiment. The driving module 108 is adapted to generate a stimulation signal 118 and to transmit the stimulation signal 118 to a driving channel of the touch panel 102. A charge signal 120 is generated in response to the stimulation signal 118 through a coupling capacitance $C_m$ in the touch panel 102. The receiving module 110 is adapted to receive the charge signal 120 from a sensing channel of the touch panel 102 and to detect whether the touch panel 102 is being touched. The various components of the system 100 are further described below.

The touch panel 102, as illustrated, is a mutual capacitance touch panel having M row conductors 103 in the "x" direction and N column conductors 104 in the "y" direction. In the example shown, M is 5 and N is 4 for illustration purposes. Any number of row conductors 103 and any number of column conductors 104 are fully contemplated in the present disclosure. In embodiments, the row and column conductors may be placed into two separate layers or in one common layer without physically touching each other. The row conductors 103 and the column conductors 104 may cross at a right angle as shown or at other angles. At the intersection of each row conductor 103 and each column conductor 104, a mutual capacitance $C_m$ is formed. In the following discussion, a row conductor 103 is also referred to as a driving channel of the touch panel 102, and a column conductor is also referred to as a sensing channel of the touch panel 102. In some embodiments, the touch panel 102 may be a self-capacitance touch panel.

The controller 106 is adapted to provide controls to the various modules of the system 100. For example, it may access the storage unit 112 for system data, read data from the receiving module 110, and control the driving module 108 to generate the stimulation signal 118 and to selectively apply the stimulation signal 118 to the row conductors 103.

The driving module 108 is adapted to generate one or more stimulation signals 118. In the present disclosure, at least one of the stimulation signals 118 is a composite signal which includes a plurality of sub-stimulation signals. In the example shown in FIG. 1A, the stimulation signal Tx is such a composite signal which includes k sub-stimulation signals, where k is an integer greater than 1. The k sub-stimulation signals are each characterized by a frequency $\omega_i$ and an amplitude $A_i$, where "i" is in [1, k]. In the following discussion, the stimulation signal 118 refers to such a composite signal.

The set of the frequencies, $\{\omega_i\}$, of the sub-stimulation signals are orthogonal with respect to each other. In an embodiment, the frequencies of the sub-stimulation signals can be set up according to the principles of orthogonal frequency-division multiplexing (OFDM).

The set of the amplitudes, $\{A_i\}$, of the sub-stimulation signals can be individually set prior to the sensing operations or can be generated on the fly at run time. Each of the amplitudes may be set or generated below a threshold so as to advantageously reduce the requisite dynamic range in the driving and the receiving modules. In embodiments, the set of the amplitudes can be set or generated to have the same value, to form a subset of a random sequence, or to have correlation among them. For example, they may form a subset of an error-correcting code, such as a Hadamard code. In another embodiment, they may form a subset of a Zadoff-Chu sequence.

In response to the composite stimulation signal 118, the charge signal 120 is also a composite signal having a plurality of sub-charge signals. The receiving module 110 is adapted to detect the amplitudes of the sub-charge signals at the orthogonal frequencies, and to make decisions about the capacitance or the change of the capacitance being measured.

Advantageously, the system 100 is capable of sensing a capacitance or a change thereof by using multiple orthogonal signals simultaneously. Since the signals are orthogonal, they do not interfere with each other at the driving and the receiving modules for the capacitance sensing operations. Further, the amplitudes of the sub-stimulation signals can be set or generated according to a scheme known by both the driving and the receiving modules. This enables the receiving module to detect signal corruptions due to noises and to handle the corrupted sub-charge signals accordingly, which will be described in more details later. This greatly increases the noise immunity of the touch panel system. Still further, there are multiple sub-charge signals, and it is unlikely that noises will corrupt all sub-charge signals at the same time. Therefore, at least some of the sub-charge signals are still usable for making capacitance measurement. This increases the reliability of the touch panel system.

The storage unit 112 may be random access memory (RAM), read only memory (ROM), flash memory, other types of storage medium, or a combination thereof. The storage unit 112 may store system data, such as the configurations and parameters of the touch panel 102, the driving module 108, and the receiving module 110. The storage unit 112 also stores the results produced by the receiving module 110, such as the measured values of the capacitance or the changes thereof.

In embodiments, the controller 106, the driving module 108, and the receiving module 110 may be implemented in one or more processors, such as ARM processors or other processors with similar functionality and capabilities, or in one or more dedicated logic, such as an application specific integrated circuit (ASIC) or a field programmable gate array (FPGA). The various components of the system 100 may communicate with one or more processors (not shown) that perform system-level and user-level functions in response to the touch events sensed by the system 100.

In an exemplary operation, the driving module 108 transmits one stimulation signal 118 to one row conductor 103 at a time and the receiving module 110 senses the charge signal 120 from the column conductors 104 one by one (or all at once in a parallel processing). The results 114 are stored in the storage unit 112. This completes a "scan" of one row. This process repeats until all rows are scanned. The timing for the driving and sensing operations can be controlled by the controller 106. When a finger touches the panel 102, it changes the panel capacitance at the touch point. Accordingly, the sub-charge signal amplitudes at the orthogonal frequencies change, indicating the touch positions. In a noisy environment, one or more of the sub-charge signals may be corrupted. The receiving module is capable of detecting the corruptions to avoid false sensing.

Figure 1B:
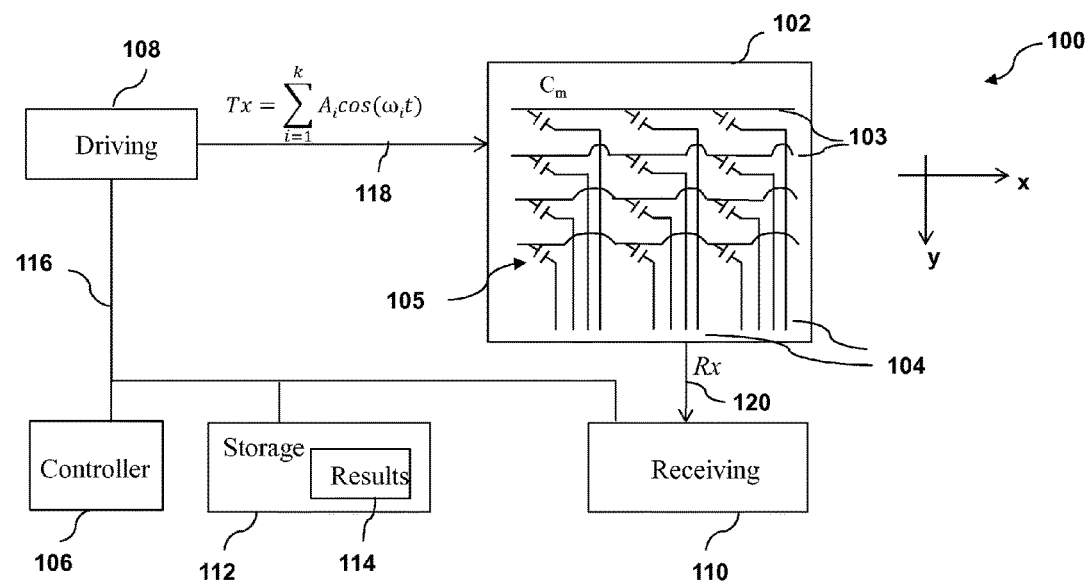
FIG. 1B is a schematic diagram illustrating another capacitive sensing system according to aspects of the present disclosure

FIG. 1B illustrates another embodiment of the capacitive sensing system 100 where the capacitive sensing apparatus 102 is a fingerprint sensor. Referring to FIG. 1B, the fingerprint sensor 102 includes an array of sensors 105 which is represented by a capacitance $C_m$ between each row conductor (driving channel) 103 and each column conductor (sensing channel) 104. The principles of capacitance sensing in this system are similar to those discussed above with respect to FIG. 1A.

In embodiments, the driving module 108 may drive the stimulation signal 118 onto one row conductor 103 at a time or multiple row conductors 103 at the same time, and the receiving module 110 may sense (or monitor) one column conductor 104 at a time or multiple column conductors 104 at the same time. When a finger is pressed onto the fingerprint sensor 102, the ridges and valleys of the finger affect different sensors 105. The ridges reduce the capacitance of the sensors 105 more than the valleys do. Therefore, the charge signals 120 (and the sub-charge signals thereof) corresponding to the ridges will have smaller signal amplitude than those corresponding to the valleys. By detecting the sub-charge signal amplitudes, the system 100 is able to recognize and record the fingerprint.

Advantageously, by using multiple orthogonal signals simultaneously, the system 100 is capable of sensing minute capacitance changes, thereby increasing the accuracy of the fingerprint scanning operations.

Figure 2:
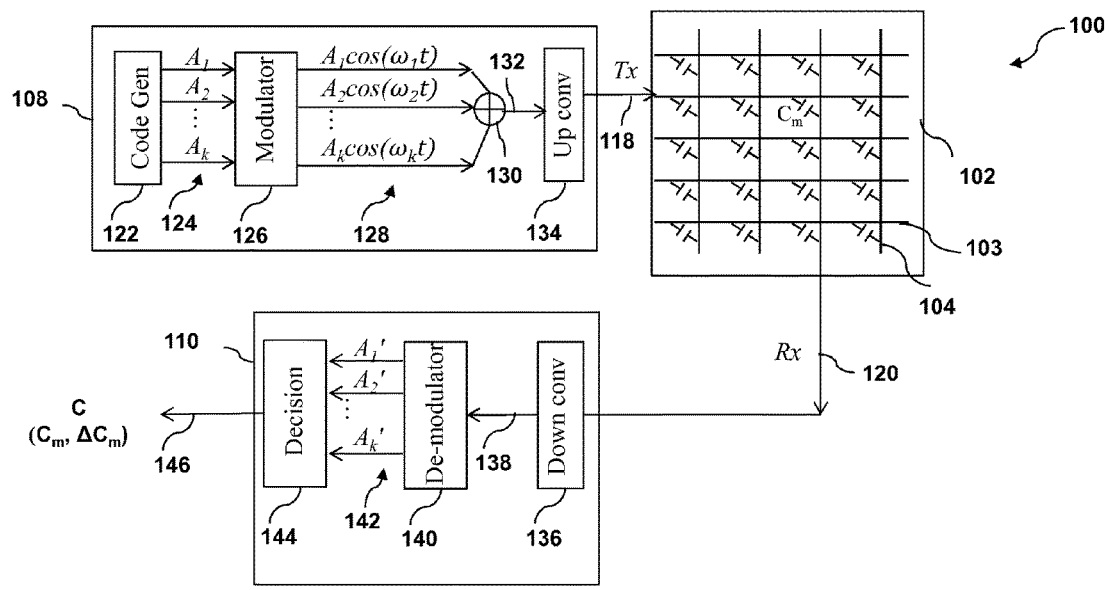
FIG. 2 is a more detailed schematic illustration of driving and sensing modules in the capacitive sensing system of FIG. 1A or 1B, in accordance to some embodiments.

FIG. 2 illustrates an embodiment of the capacitive sensing system 100 with the driving module 108 and the receiving module 110 in a more detailed view, in accordance with some embodiments. For the sake of simplicity, FIG. 2 does not show the controller 106, the storage unit 112, and the system bus 116. Furthermore, even though the capacitive sensing apparatus 102 is shown as a touch panel, it can also be a fingerprint sensor.

Referring to FIG. 2, in an embodiment, the driving module 108 includes a code generator 122, a modulator 126, a mixer 130, and an up-converter 134. In embodiments, the driving module 108 may optionally include one or more of these components.

The code generator 122 is adapted to generate a plurality of codes 124, $\{A_1, A_2, \ldots, A_k\}$, where k is an integer greater than 1. In an embodiment, the codes 124 are generated to have the same value. In another embodiment, the codes 124 are generated randomly. In yet another embodiment, the codes 124 are generated to have correlation among them. For example, the codes 124 may form a subset of an error-correcting code, such as a Hadamard code. The correlation among the codes 124 can be used in the receiving module 110 for error detection. In yet another embodiment, the codes 124 form a subset of a Zadoff-Chu sequence, for example, to reduce interference in the system. In a further embodiment, the codes 124 are generated to be below a threshold and/or the sum of the codes 124 is below a threshold so as to reduce the requisite dynamic range in the driving module 108 and the receiving module 110.

The modulator 126 is adapted to modulate a plurality of orthogonal frequencies, $\{\omega_1, (\omega_2, \ldots, \omega_k\}$, with the codes 124, thereby generating a plurality of sub-stimulation signals 128. In the example shown in FIG. 2, each of the sub-stimulation signals 128 is denoted in the time domain by $A_i \cos(\omega_i t)$ where i is in [1, k]. In embodiments, the orthogonal frequencies, $\{\omega_1, \omega_2, \ldots, \omega_k\}$, are set up in accordance with the principles of OFDM. In embodiments, the modulation can be a direct amplitude modulation, a quadrature amplitude modulation (QAM), a phase-shift keying (PSK), or other suitable modulation methods.

The mixer 130 is adapted to combine the sub-stimulation signals 128 into one time-domain signal 132. In an embodiment, the mixer 130 may produce a set of time-domain samples, for example, by running an inverse fast Fourier transformation (IFFT). To further this embodiment, the mixer 130 may further include one or more digital to analog converters (DAC) to convert the samples to the time-domain signal 132 in analog form. It is understood that the operations may involve complex samples.

The up-converter 134 is adapted to convert the time-domain signal 132 to the stimulation signal 118 which has a higher center frequency than the signal 132. In an embodiment, the signal 132 is used to modulate a cosine wave at a higher frequency to produce the stimulation signal 118. In another embodiment where the signal 132 has a real part and an imaginary part, the two parts are used to modulate a cosine wave and a sine wave at a higher frequency respectively, and then summed to form the stimulation signal 118. Other forms or methods of performing the code generation, modulation, mixing, and up-conversion to generate the stimulation signal 118 are fully contemplated in the present disclosure.

Still referring to FIG. 2, in an embodiment, the receiving module 110 includes a down-converter 136, a de-modulator 140, and a decision unit 144. In embodiments, the receiving module 110 may optionally include one or more of these components. The down-converter 136 reverses the operations of the up-converter 134. It removes the high frequency component from the charge signal 120 and generates a signal 138 which has a lower frequency than the charge signal. For example, the signal 138 may be baseband signal or an intermediate frequency band signal. The signal 138 is a composite signal having sub-charge signals at the orthogonal frequencies $\{\omega_1, \omega_2, \ldots, \omega_k\}$. The de-modulator 140 de-modulates the signal 138, for example, by running a fast Fourier transformation (FFT) and sampling at the orthogonal frequencies $\{\omega_1, \omega_2, \ldots, \omega_k\}$ to detect the corresponding sub-charge signal amplitudes 142, $\{A_1', A_2', \ldots, A_k'\}$, at those frequencies respectively.

The decision unit 144 makes a comprehensive decision 146 about a capacitance C which is a value (e.g., a calculation or estimation) about the capacitance $C_m$ and/or the change thereof, $\Delta C_m$, based on the sub-charge signal amplitudes 142. In an embodiment, it checks the sub-charge signal amplitudes 142 for corruption. If a sub-charge signal amplitude is found to be corrupted, the decision unit 144 may discard the corrupted sub-charge signal amplitude or give it less weight than those that are not corrupted when calculating the capacitance C. This will be further discussed later in conjunction with FIGS. 7B-7D. In an embodiment, the decision unit 144 compares the sub-charge signal amplitudes 142 with the past results from the same coupling point to detect a change in capacitance. To make the decision (or measurement), it may use the greatest change in signal amplitude, an average change in signal amplitude, a weighted average change in signal amplitude, a root mean square (RMS) of the changes in signal amplitudes, or other suitable methods.

Figure 3:
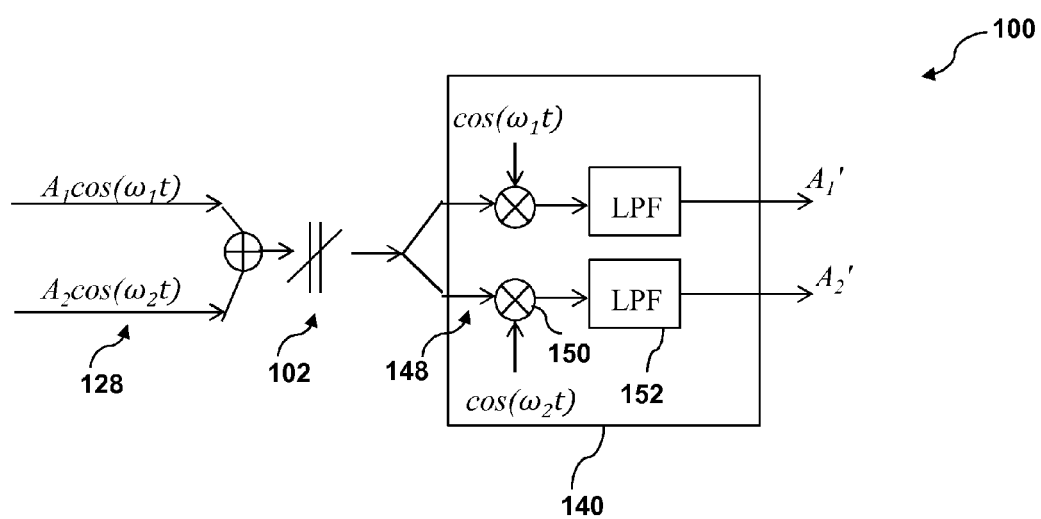
FIG. 3 is a more detailed schematic illustration of a de-modulator in the capacitive sensing system of FIG. 1A or 1B, in accordance to an embodiment.

FIG. 3 illustrates an embodiment of the capacitive sensing system 100 with the de-modulator 140 in a more detailed view, in accordance with some embodiments. For the sake of simplicity, many components of the system 100 are not shown. Further, the number of sub-stimulation signals, k, is 2 in this embodiment for illustration purposes. Referring to FIG. 3, two sub-charge signals 148 are generated in response to the sub-stimulation signals 128 through the coupling capacitance of the capacitive sensing apparatus 102. The two sub-charge signals 148 are sampled by two samplers 150 at their corresponding frequencies $\omega_1$ and $\omega_2$ respectively. The sampling is performed at the same frequencies and phases as the sub-stimulation signals. Thereafter, two low pass filters (LPF) 152 remove the high frequency components (i.e. $2\omega_1$ and $2\omega_2$) and produce the sub-charge signal amplitudes $A_1'$ and $A_2'$.

Figure 4:
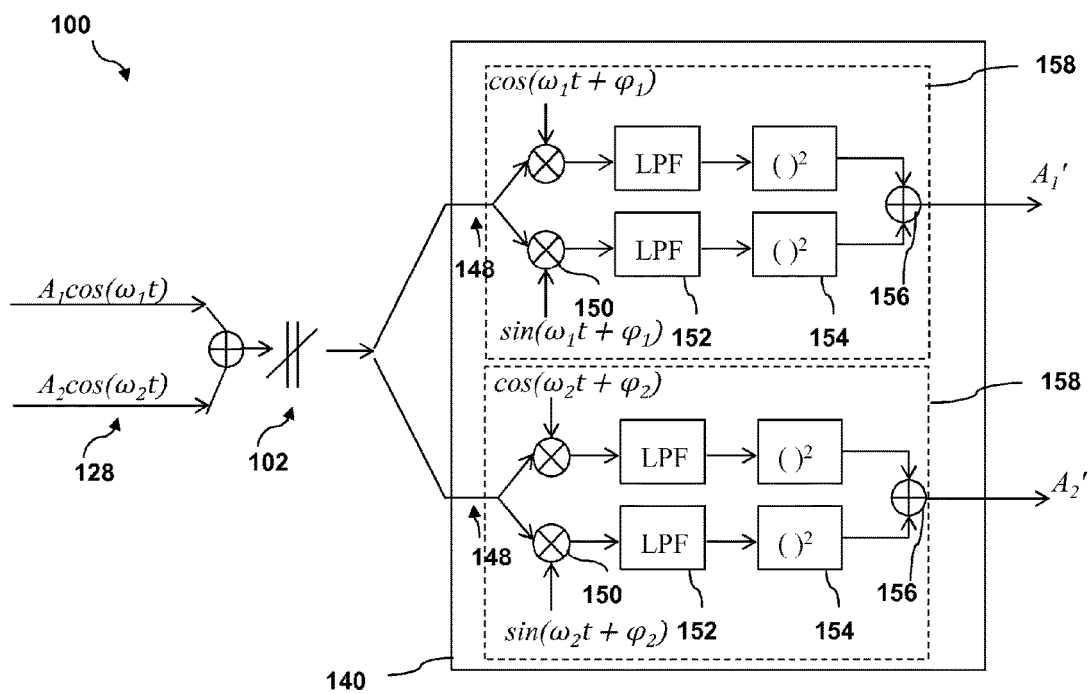
FIG. 4 is a more detailed schematic illustration of a de-modulator in the capacitive sensing system of FIG. 1A or 1B, in accordance to another embodiment.

FIG. 4 illustrates an embodiment of the capacitive sensing system 100 with the de-modulator 140 in a more detailed view, in accordance with some embodiments. For the sake of simplicity, many components of the system 100 are not shown. Further, the number of sub-stimulation signals, k, is 2 in this embodiment for illustration purposes. Referring to FIG. 4, two sub-charge signals 148 are generated in response to the sub-stimulation signals 128 through the coupling capacitance of the capacitive sensing apparatus 102. The two sub-charge signals 148 are de-modulated by the de-modulator 140 to extract their respective amplitudes $A_1'$ and $A_2'$. In FIG. 4, the de-modulator 140 includes two match filter decoders 158. Each of the match filter decoder 158 includes two samplers 150, two low pass filters (LPF) 152, two squaring units 154, and an adder 156. The match filter decoders 158 allow the sampling of the sub-charge signals 148 to be performed at the same frequencies as the sub-stimulation signals but with different phases. This increases flexibility in designing the clocking and timing circuitry of the system 100.

Figure 5:
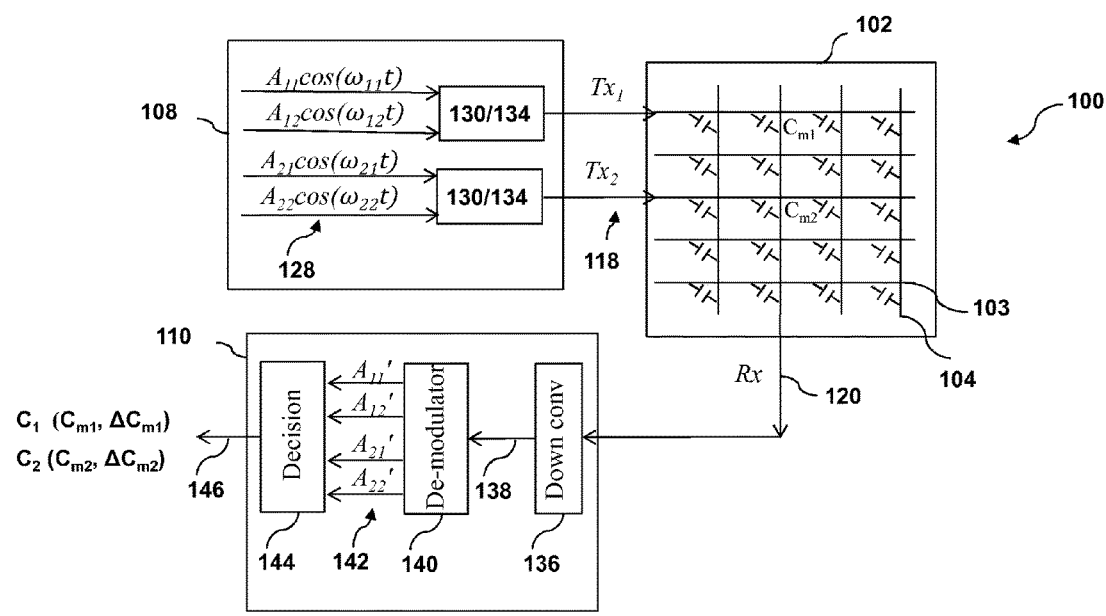
FIG. 5 is a schematic diagram illustrating another capacitive sensing system according to aspects of the present disclosure.

FIG. 5 illustrates another embodiment of the capacitive sensing system 100, constructed according to various aspects of the present disclosure. For the sake of simplicity, not all components of the system 100 are shown. The capacitive sensing apparatus 102 is a touch panel in the embodiment shown. In another embodiment the capacitive sensing apparatus 102 is a fingerprint sensor. Referring to FIG. 5, the driving module 108 generates two stimulation signals 118, $Tx_1$ and $Tx_2$, and transmits the two stimulation signals to two row conductors 103 at the same time. Each of the two stimulation signals is generated with the same principles as described above with respect to the stimulation signal 118 in FIGS. 1A and 2. In the example shown in FIG. 5, $Tx_1$ includes two sub-stimulation signals characterized by frequencies $\{\omega_{11}, \omega_{12}\}$ and amplitudes $\{A_{11}, A_{12}\}$ respectively, and $Tx_2$ includes two sub-stimulation signals characterized by frequencies $\{\omega_{21}, \omega_{22}\}$ and amplitudes $\{A_{21}, A_{22}\}$ respectively. In addition, the frequencies $\{\omega_{11}, \omega_{12}, \omega_{21}, \omega_{22}\}$ are orthogonal. The two sets of the amplitudes $\{A_{11}, A_{12}\}$ and $\{A_{21}, A_{22}\}$ may be generated by one code generator, such as the code generator 122 of FIG. 2, or by two separate code generators.

Still referring to FIG. 5, a charge signal 120 is generated in response to the two stimulation signals 118 through two coupling capacitances, $C_{m1}$ and $C_{m2}$, between the two row conductors 103 and the one column conductor 104. Accordingly, the charge signal 120 includes four sub-charge signals at the orthogonal frequencies $\{\omega_{11}, \omega_{12}, \omega_{21}, \omega_{22}\}$ respectively. The receiving module 110 detects the amplitudes, $\{A_{11}', A_{12}', A_{21}', A_{22}'\}$, of the sub-charge signals. In an embodiment, the decision unit 144 uses the amplitudes $\{A_{11}', A_{12}'\}$ to calculate a capacitance $C_1$ which is a value (e.g., a calculation or estimation) about the capacitances $C_{m1}$ and/or $\Delta C_{m1}$, and uses the amplitudes $\{A_{21}', A_{22}'\}$ to calculate another capacitance $C_2$ which is a value about the capacitances $C_{m2}$ and/or $\Delta C_{m2}$.

Advantageously, the capacitive sensing system 100 is capable of scanning two row conductors simultaneously, thereby increasing the rate of the sensing operations. In embodiments, the system 100 may be scanned more than two rows at a time with the same principles discussed above. Further, in embodiments, the stimulation signals $Tx_1$ and $Tx_2$ may have the same number of sub-stimulation signals (e.g., each has two sub-stimulation signals as shown in FIG. 5), or have different numbers of sub-stimulation signals. For example, $Tx_1$ has two sub-stimulation signals while $Tx_2$ has three sub-stimulation signals. This increases design flexibility.

Figure 6:
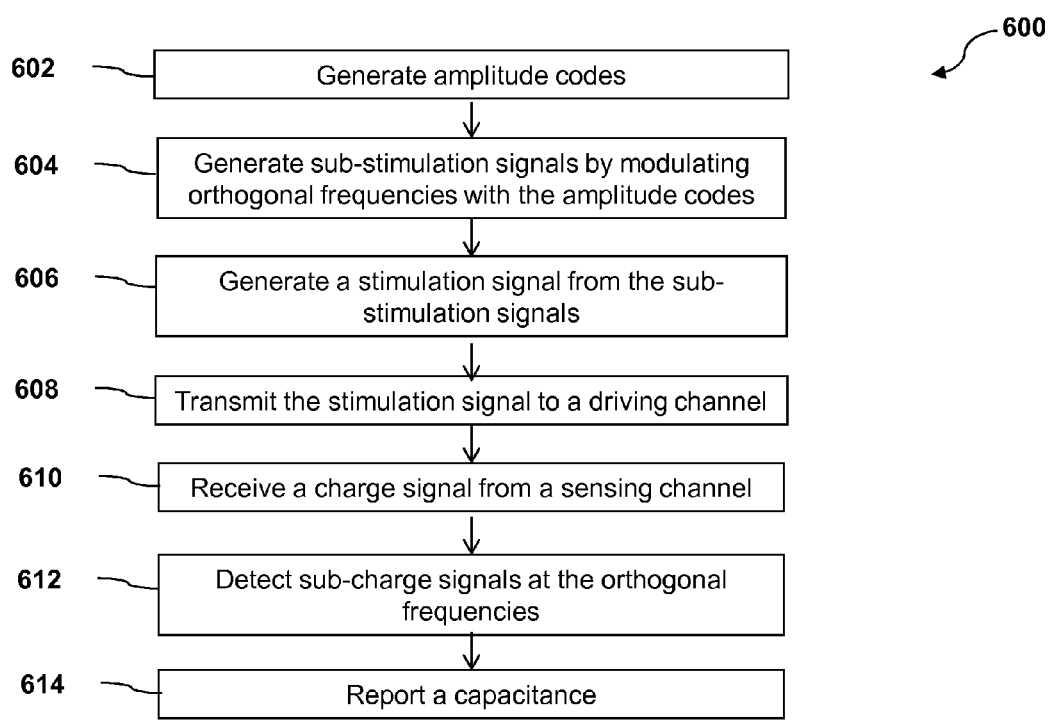
FIG. 6 shows a method of driving and sensing for a capacitive sensing device according to various aspects of the present disclosure.

FIG. 6 shows a flow chart of a method 600 for driving and sensing for a capacitive sensing device, such as the capacitive sensing system 100 of FIG. 1A or FIG. 1B, according to various aspects of the present disclosure. The method 600 is an example, and is not intended to limit the present disclosure beyond what is explicitly recited in the claims. Additional operations can be provided before, during, and after the method 600, and some operations described can be replaced, eliminated, or moved around for additional embodiments of the method. The method 600 is described below in conjunction with FIGS. 1A-5 and 7A-7D. Some reference numerals from those figures are repeated below for indicating same or similar features.

At step 602, the method 600 (FIG. 6) generates a plurality of amplitude codes 124, $\{A_1, A_2, \ldots, A_k\}$, where k is an integer greater than 1. In an embodiment, the amplitude codes 124 are generated with the same principles as described with reference to the code generator 122 of FIG. 2. In an embodiment, the amplitude codes are each below a threshold so as to reduce the requisite dynamic range in the driving and sensing modules of the capacitive sensing device. In another embodiment, the sum of the amplitude codes is below a threshold for a purpose similar to the above. The amplitude codes may have the same value or have randomly generated values. In an embodiment, the amplitude codes have correlation among them so as to enable the receiving module to detect signal corruption. For example, the amplitude codes may form a subset of an error-correcting code, such as a Hadamard code. In yet another embodiment, the amplitude codes form a subset of a Zadoff-Chu sequence, for example, to reduce interference in the system.

At step 604, the method 600 (FIG. 6) generates a plurality of sub-stimulation signals 128 whose frequencies are orthogonal. In an embodiment, the sub-stimulation signals 128 are generated by modulating a plurality of orthogonal frequencies, $\{\omega_1, \omega_2, \ldots, \omega_k\}$, with the amplitude codes $\{A_1, A_2, \ldots, A_k\}$ respectively. In an embodiment, the frequencies $\{\omega_1, \omega_2, \ldots, \omega_k\}$ are setup according to the principles of OFDM. In an embodiment, the modulation of the frequencies is similar to what is described with reference to the modulator 126 of FIG. 2.

At step 606, the method 600 (FIG. 6) generates a stimulation signal 118 from the plurality of the sub-stimulation signals 128. In an embodiment, this involves combining the sub-stimulation signals 128 into one time-domain signal and modulating a higher frequency signal with the time-domain signal to form the stimulation signal 118. In an embodiment, the stimulation signal 118 is generated with the same principles as what are described with reference to the mixer 130 and the up-converter 134 of FIG. 2.

At step 608, the method 600 (FIG. 6) transmits the stimulation signal 118 to a driving channel of the capacitive sensing device. In an example, the driving channel corresponds to a row conductor 103 of the capacitive sensing system 100 of FIG. 2. The stimulation signal 118 causes a charge signal 120 to be generated at a sensing channel of the capacitive sensing device through a coupling capacitance between the driving channel and the sensing channel. In an example, the sensing channel corresponds to a column conductor 104 of the capacitive sensing system 100 of FIG. 2.

At step 610, the method 600 (FIG. 6) receives the charge signal 120 from the sensing channel. In an embodiment, this involves converting the charge signal 120 from a higher carrier frequency to a baseband or an intermediate band frequency.

At step 612, the method 600 (FIG. 6) detects, from the charge signal 120, a plurality of sub-charge signal amplitudes 142, $\{A_1', A_2', \ldots, A_k'\}$, at the orthogonal frequencies $\{\omega_1, \omega_2, \ldots, \omega_k\}$ respectively. In an embodiment, this is performed at the same frequencies and phases as the sub-stimulation signals 128, such as shown in FIG. 3. In another embodiment, this is performed at the same frequencies as the sub-stimulation signals 128 but with different phases, such as shown in FIG. 4. In an embodiment, this involves multiple operations including an IFFT, sampling, and low pass filtering.

At step 614, the method 600 (FIG. 6) reports a capacitance based on the sub-charge signal amplitudes 142. The capacitance may be a measurement of the coupling capacitance, or a change thereof, between the driving and the sensing channels. Various decision-making methods are suitable for step 614. Some examples are given with reference to the decision unit 144 of FIG. 2. In an embodiment, method 600 performs error detection in step 614 so as to increase the reliability of the measurement. This is further shown in FIG. 7A.

Figure 7A:
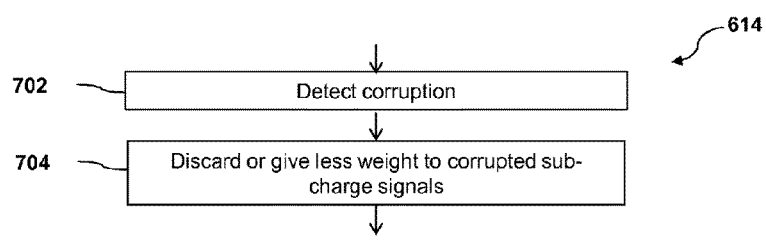
FIG. 7A shows an embodiment of a step of reporting in the method of FIG. 6, in accordance with an embodiment.
Figure 7B:
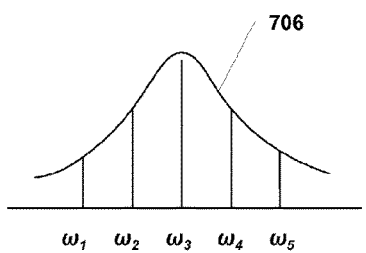
FIGS. 7B-7D illustrate signal amplitudes at orthogonal frequencies for detecting signal corruption.
Figure 7C:
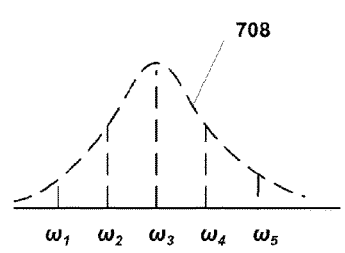
Figure 7D:
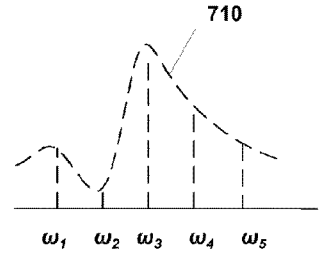

Referring to FIG. 7A, at step 702, the method 600 (FIG. 7A) detects signal corruption based on the current values and the past values of the sub-charge signal amplitudes 142. This is illustrated in FIGS. 7B-7D. Referring to FIG. 7B, shown therein is a waveform 706 that is extrapolated from the measurements of sub-charge signal amplitudes at five frequencies $\{\omega_1, \omega_2, \omega_3, \omega_4, \omega_5\}$. The waveform 706 may be established based on the testing of the capacitive sensing device at an ideal environment, i.e. free of noises. In another example, the waveform 706 may be established by approximating the sub-stimulation signal amplitudes 124, taking into account the channel characteristic of the driving module 108, the capacitive sensing apparatus 102, and the receiving module 110 (FIG. 2). In this regard, the waveform 706 may be established based on correlation among the sub-stimulation signal amplitudes 124.

FIG. 7C shows the measurements of the sub-charge signal amplitudes at the five frequencies during one sensing operation. A waveform 708 is extrapolated from the measurements. As can be seen, the waveform 708 is similar to the waveform 706. Therefore, no signal corruption is detected and all five sub-charge signal amplitudes may be used for calculating the capacitance. It is noted that proportional increase or decrease of the sub-charge signal amplitudes is considered normal.

FIG. 7D shows the measurements of the sub-charge signal amplitudes at the five frequencies during another sensing operation. A waveform 710 is extrapolated from the measurements. As can be seen, the waveform 710 is significantly dissimilar to the waveform 706. In particular, the amplitude at frequency $\omega_2$ decreases disproportionally with respect to other amplitudes. This may be caused by nearby noises at the same frequency.

The error detection method illustrated in FIGS. 7B-7D is only an example. A variety of error detection methods are contemplated in the present disclosure, taking into account the fact that multiple responses (the sub-charge signals) are available for sensing one capacitance. In an embodiment, the error detection is based on correlation among the codes generated at the step 602. In one example, the codes are a subset of an error-correcting code and the method 600 is able to detect errors in the sub-charge signal amplitudes on the fly without comparing with the historical data. This advantageously reduces the amount of data for storage.

At step 704, upon the detection of the anomaly, the method 600 (FIG. 7A) may discard the amplitude associated with the frequency $\omega_2$ and only use the other four amplitudes for calculating or estimating the capacitance. Alternatively, the method 600 (FIG. 7A) may give less weight to the amplitude associated with the frequency $\omega_2$ than the other four amplitudes and still use all five amplitudes in calculating or estimating the capacitance. This greatly increases the noise immunity of the capacitive sensing device.

Figure 8:
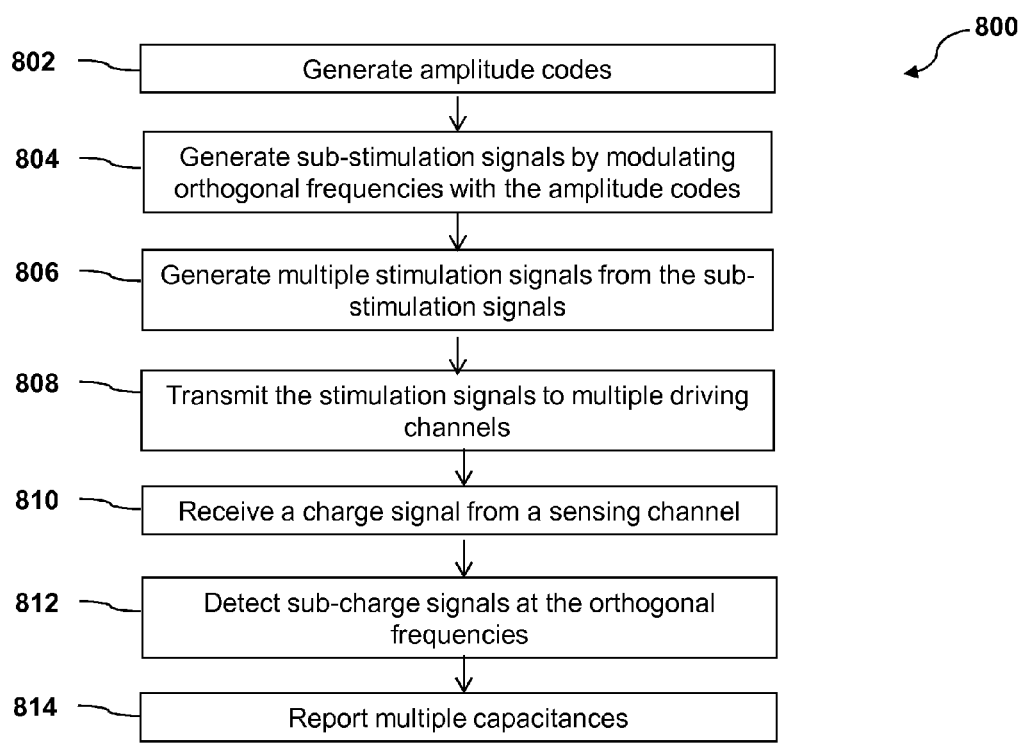
FIG. 8 shows another method of driving and sensing for a capacitive sensing device according to various aspects of the present disclosure.

FIG. 8 shows a flow chart of a method 800 for driving and sensing for a capacitive sensing device, such as the capacitive sensing system 100 of FIG. 1A or FIG. 1B, according to various aspects of the present disclosure. The method 800 is an example, and is not intended to limit the present disclosure beyond what is explicitly recited in the claims. Many respects of the method 800 and the method 600 are the same, and are omitted or abbreviated below for the sake of simplicity.

Steps 802 and 804 are similar to the steps 602 and 604 respectively.

At step 806, the method 800 generates multiple stimulation signals 118 from the sub-stimulation signals. Each of the stimulation signals 118 includes a plurality of sub-stimulation signals generated at step 804. Each of the sub-stimulation signals is characterized by an amplitude code generated in step 802 and a frequency. The frequencies of the sub-stimulation signals are orthogonal. An example of the multiple stimulation signals 118 are the signals $Tx_1$ and $Tx_2$ of FIG. 5.

At step 808, the method 800 (FIG. 8) transmits the multiple stimulation signals 118 to multiple driving channels of the capacitive sensing device, with each one of the stimulation signals being driven onto each one of the driving channels in a one-to-one mapping. In an example, the driving channels correspond to row conductors 103 of the capacitive sensing system 100 of FIG. 5. The stimulation signal 118 causes a charge signal 120 to be generated at a sensing channel of the capacitive sensing device through coupling capacitances between the driving channels and the sensing channel. In an example, the sensing channel corresponds to a column conductor 104 of the capacitive sensing system 100 of FIG. 5.

Steps 810 and 812 are similar to the steps 610 and 612 respectively (FIG. 6).

At step 814, the method 800 (FIG. 8) reports multiple capacitances, each corresponding to a coupling capacitance between the sensing channel and one of the driving channels. In an embodiment, this is similar to the operation of the decision unit 144 of FIG. 5.

One benefit of the method 800 is to enable multiple row conductors to be scanned simultaneously, thereby increasing the rate of the sensing operations.

Although not intended to be limiting, one or more embodiments of the present disclosure provide many benefits to event sensing devices, particularly to capacitive multi-touch panel systems. For example, embodiments of the present disclosure utilize multiple orthogonal signals simultaneously in detecting a capacitance or a change of capacitance. This greatly increases the system's noise immunity and increases measurement accuracy. Furthermore, the orthogonal signals may have smaller amplitudes than the conventional stimulus so as to reduce the power consumption of the system and to reduce the requisite dynamic range in the driving and sensing circuits. Further still, embodiments of the present disclosure enable error detection in the sensing operations to avoid false touch detection. This increases the reliability and sensing accuracy of the systems. Also, embodiments of the present disclosure can scan multiple driving channels simultaneously so as to increase the operation rate of the capacitance sensing.

Persons having ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A method of driving and sensing for a capacitive sensing device, comprising:
    transmitting a stimulation signal to a driving channel of the capacitive sensing device, wherein the stimulation signal includes a plurality of sub-stimulation signals, each of the sub-stimulation signals is characterized by an amplitude and a frequency, and the frequencies of the sub-stimulation signals are orthogonal, wherein the transmitting of the stimulation signal includes combining the sub-stimulation signals into a first signal that has a lower frequency than the stimulation signal and converting the first signal to the stimulation signal;
    receiving a charge signal from a sensing channel of the capacitive sensing device, wherein the charge signal is generated from the stimulation signal through a capacitance between the driving channel and the sensing channel;
    detecting, from the charge signal, a plurality of sub-charge signal amplitudes at the frequencies of the sub-stimulation signals; and
    reporting a value about the capacitance from the sub-charge signal amplitudes.

2. The method of claim 1, wherein the reporting of the value about the capacitance includes:
    checking the sub-charge signal amplitudes for corruption; and
    upon a condition in which a corrupted sub-charge signal amplitude is found, giving it less weight than the ones of the sub-charge signal amplitudes that are not corrupted.

3. The method of claim 2, wherein the checking of the sub-charge signal amplitudes for corruption is based on correlation among the amplitudes of the sub-stimulation signals.

4. The method of claim 1, wherein the amplitudes of the sub-stimulation signals are the same.

5. The method of claim 1, wherein the amplitudes of the sub-stimulation signals form a subset of a random sequence.

6. The method of claim 1, wherein the amplitudes of the sub-stimulation signals form a subset of an error-correcting code.

7. The method of claim 6, wherein the error-correcting code is a Hadamard code.

8. The method of claim 1, wherein the amplitudes of the sub-stimulation signals form a subset of a Zadoff-Chu sequence.

9. The method of claim 1, wherein the detecting of the plurality of sub-charge signal amplitudes is performed at the same frequencies and phases as the sub-stimulation signals.

10. The method of claim 1, wherein the detecting of the plurality of sub-charge signal amplitudes is performed at the same frequencies as the sub-stimulation signals but with different phases.

11. A method of driving and sensing for a capacitive sensing device, comprising:
    generating a plurality of stimulation signals, wherein each of the stimulation signals includes a plurality of sub-stimulation signals, each of the sub-stimulation signals is characterized by an amplitude and a frequency, and the frequencies of all the sub-stimulation signals are orthogonal, wherein the generating of the stimulation signals includes, for each of the stimulation signals, combining the respective sub-stimulation signals into a first signal that has a lower frequency than the stimulation signal and up-converting the first signal to the stimulation signal;
    transmitting the stimulation signals to a plurality of driving channels of the capacitive sensing device, wherein each one of the stimulation signals corresponds to each one of the driving channels;
    receiving a charge signal from a sensing channel of the capacitive sensing device, wherein the charge signal is generated from the stimulation signals through capacitances between the driving channels and the sensing channel;
    detecting, from the charge signal, a plurality of sub-charge signal amplitudes at the frequencies of the sub-stimulation signals; and
    reporting values about the capacitances from the sub-charge signal amplitudes.

12. The method of claim 11, wherein the stimulation signals each have the same number of sub-stimulation signals.

13. The method of claim 11, wherein at least two of the stimulation signals have different numbers of sub-stimulation signals.

14. The method of claim 11, wherein the amplitudes of the sub-stimulation signals are the same.

15. The method of claim 11, wherein the amplitudes of the sub-stimulation signals form a subset of: a random sequence, an error-correcting code, or a Zadoff-Chu sequence.

16. The method of claim 11, wherein the reporting of the values about the capacitances includes:
    checking the sub-charge signal amplitudes for corruption; and upon a condition in which a corrupted sub-charge signal amplitude is found, giving it less weight than the ones of the sub-charge signal amplitudes that are not corrupted.

17. A system of driving and sensing for a capacitive sensing device, comprising:

a driving module, adapted to transmit a stimulation signal to a driving channel of the capacitive sensing device, wherein the stimulation signal includes a plurality of sub-stimulation signals, each of the sub-stimulation signals is characterized by an amplitude and a frequency, the frequencies of the sub-stimulation signals are orthogonal, and the sub-stimulation signals are transmitted to the driving channel simultaneously; and a receiving module, adapted to perform:

receiving a charge signal from a sensing channel of the capacitive sensing device wherein the charge signal is generated from the stimulation signal through a capacitance between the driving channel and the sensing channel;

detecting, from the charge signal, a plurality of sub-charge signal amplitudes at the frequencies of the sub-stimulation signals; and reporting a value about the capacitance from the sub-charge signal amplitudes, wherein the driving module includes:

a code generator, adapted to generate a plurality of codes;

a modulator, adapted to modulate a plurality of orthogonal frequencies with the plurality of codes so as to generate the sub-stimulation signals;

a mixer, adapted to combine the sub-stimulation signals into a first signal that has a lower frequency than the stimulation signal; and an up-converter, adapted to convert the first signal to the stimulation signal.

18. The system of claim 17, wherein the receiving module includes:

a down-converter, adapted to convert the charge signal to a second signal that has a lower frequency than the charge signal;

a de-modulator, adapted to detect the plurality of sub-charge signal amplitudes from the second signal; and a decision unit, adapted to calculate the value about the capacitance from the sub-charge signal amplitudes.

19. The system of claim 18, wherein:

the de-modulator includes a plurality of match filter decoders at the orthogonal frequencies.

* * * * *